Feb. 4, 1969  L. J. WOLF  3,425,527

TRANSMISSION CLUTCH

Filed July 7, 1967  Sheet _1_ of 2

INVENTOR:
LLOYD J. WOLF
BY Bedell & Burgess
ATTORNEYS.

Feb. 4, 1969 L. J. WOLF 3,425,527

TRANSMISSION CLUTCH

Filed July 7, 1967

INVENTOR:
LLOYD J. WOLF
BY Bedell & Burgess
ATTORNEYS

United States Patent Office 3,425,527
Patented Feb. 4, 1969

3,425,527
TRANSMISSION CLUTCH
Lloyd J. Wolf, 2425 Irving Blvd.,
Dallas, Tex. 75207
Filed July 7, 1967, Ser. No. 651,862
U.S. Cl. 192—48.6                10 Claims
Int. Cl. F16d 47/04, 11/04, 25/061

ABSTRACT OF THE DISCLOSURE

A transmission having a power input shaft and driving gears rotatably mounted thereon, a first collar slidably and nonrotatably mounted on the input shaft, radial tooth-like means on said driving gear and said collar engageable upon sliding of said collar toward said driving gear for aligning splines on said collars with splines on said driving gear, said tooth-like means being arranged to prevent reverse power flow from said driving gear to said input shaft during shifting operations, and a shift collar slidably and nonrotatably mounted on said first collar and having internal splines engaging said first collar splines and slidable therealong into engagement with said driving gear splines when said tooth-like means are in spline-aligning engagement.

*Field of the invention*

The invention relates to transmissions of the constant mesh type and specifically to improved means for facilitating the engagement of splines on the input shaft-mounted shift collar and the driving gears.

*Description of the prior art*

Conventional transmissions of the constant mesh type utilize friction means for bringing the shift collar and driving gear to the same speed, after which further movement of the shift fork brings the inner splines on the shift collar into engagement with the outer splines on the driving gear, the ends of the latter being beveled to facilitate meshing.

*Summary of the invention*

The invention is directed to a power transmission device including positive, one-way drive means for aligning the splines on the driving gears with those on the input shaft-mounted shift collar.

Figure 1:
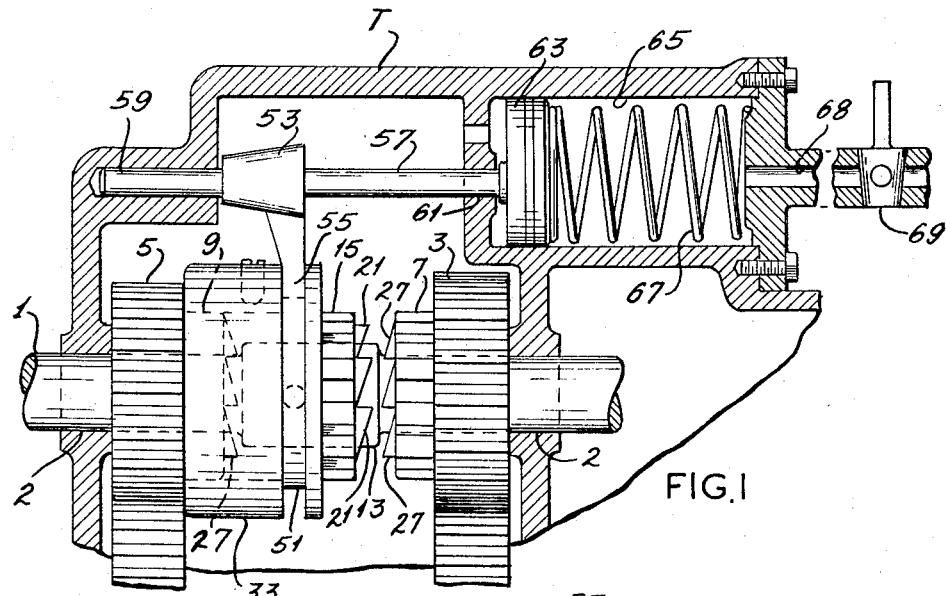
FIG. 1 is a side elevational view of the device incorporating the invention, with the housing vertically sectionalized along the center line of the drive shaft, to show the internal construction.

An input shaft 1, which may be driven by an automobile engine (not shown) is journaled at 2, 2 in transmission housing T and rotatably mounts, by means of bushings 4, a pair of driving gears 3 and 5 spaced apart axially of the shaft. Gears 3 and 5 are formed respectively, on their opposing sides, with smaller diameter projections 7 and 9 both splined as at 11.

The portion of shaft 1 between gear extensions 7 and 9 is splined as at 13 and slidably mounts a collar 15 inwardly splined as at 17 and outwardly splined as at 19.

Both ends of sliding collar 15 are formed with radial tooth-like projections 21 having their forward surfaces 23 parallel to the axis of rotation and their rear surfaces 25 inclined with respect to the axis of rotation.

The transverse surfaces of projections 7 and 9 of gears 3 and 5 are provided with similar tooth-like projections 27 having their forward surfaces 29 inclined with respect to the axis of rotation at a similar angle to the rear edges 25 of projections 21 on collar 15 and their rear surfaces 31 extend parallel to the shaft axis so that when collar 15 is moved axially into engagement with either gear projection 7 or 9, rotational forces will be transmitted in one direction only from collar 15 to the engaged projection 7 or 9 and associated driving gear 3 or 5.

For completing the shift, after cooperating teeth 21 and 27 have become engaged by axial movement of sliding collar 15, an outer shift collar 33 is formed with inward splines 35 and is thereby slidably mounted on outer splines 19 on sliding collar 15, being movable axially thereof so that its grooves 35 interlock with splines 11 on extension 7 or 9 of gears 3 or 5, depending on the direction of movement.

For positioning shift collar 33 and sliding collar 15 lengthwise relative to each other, the latter is formed with three spaced notches 37, 39 and 41, each having sloping sides and being disposed symmetrically lengthwise of the sliding collar, with notch 39 centered and notches 37 and 41 spaced equal distances from notch 39 and in proximity with the ends of the sliding collar.

Midway between its ends, shift collar 33 is formed with a radial bore 43 aligned radially with the notched spline 19 of the sliding collar and a round-ended plunger 45 is slidably mounted in bore 43 and is resiliently biased radially inwardly toward notched spline 19 by a spring 47 seated at its outer end against plug 49 so that, when bore 43 is radially aligned with any of notches 37, 39 or 41, the rounded end of plunger 45 will project into the notch.

For effecting shifting movements of the collars, shift collar 33 is formed with an annular slot 51 in its outer surface, to receive shift fork 53.

Shift fork 53 has tines 55 slidably received in slot 51 and is mounted on vacuum piston rod 57, the ends of which are slidably and guidably received in openings 59 and 61 in the transmission wall structure T. One end of piston rod 57 is secured to piston 63 which is slidably mounted in a vacuum cylinder 65 formed in the transmission wall structure. A spring 67 within cylinder 65 biases piston 63, rod 57, and shift fork 53, 55 to the left so that shift collar 33 is normally in engagement with driving gear 5. A conduit 68 including normally closed valve 69 communicates with a vacuum source (not shown) so that, by opening valve 69, cylinder 65 can be evacuated, causing piston 63, rod 57 shift fork 53, 55 to move to the right and out of engagement with driving gear 5 and toward engagement with driving gear 3.

Figure 2:
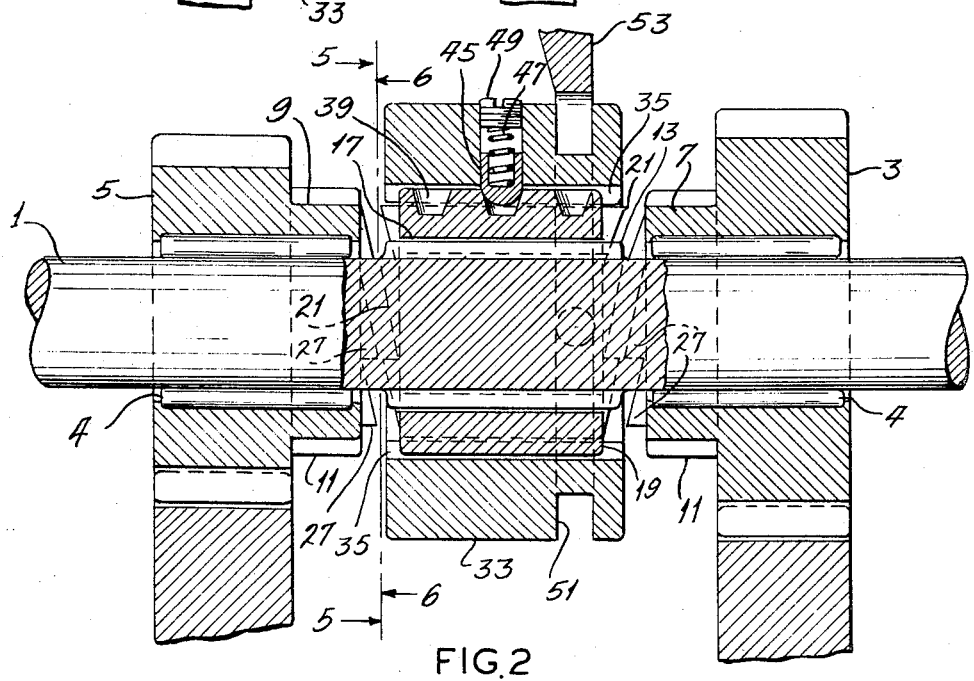
FIG. 2 is a longitudinal vertical sectional view of the device, taken along the center line of the drive shaft, and showing the parts in neutral position.
Figure 3:
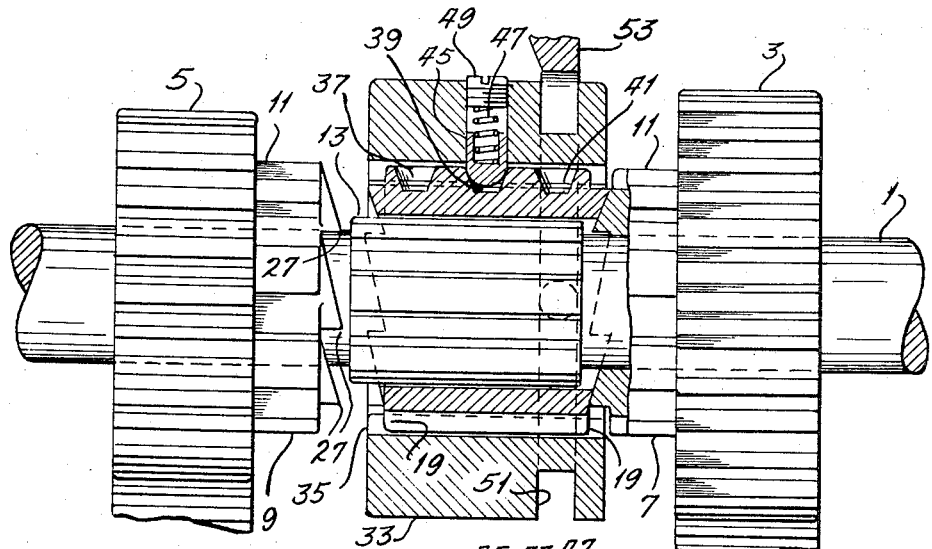
FIG. 3 is a side elevational view of the device, partially sectionalized along the center line of the drive shaft, showing the first stage of a shift from neutral to engaged position.
Figure 4:
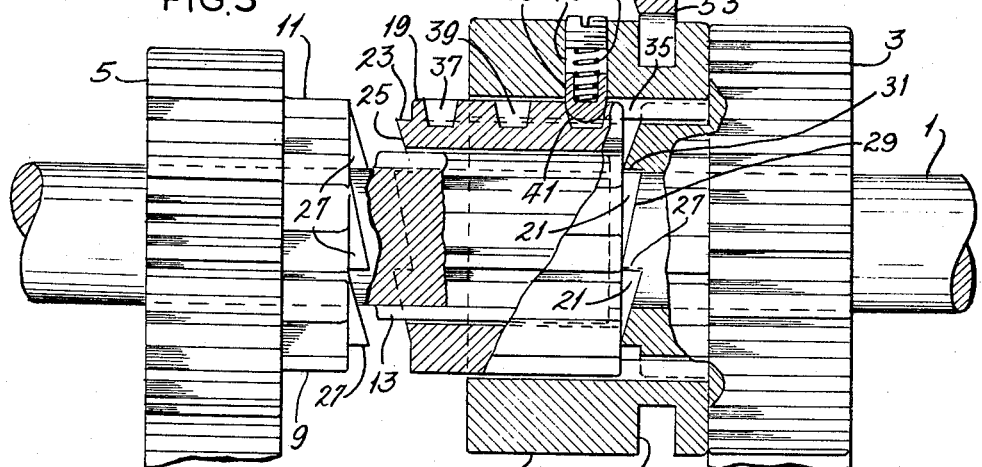
FIG. 4 is a side elevational view of the device, partially sectionalized along the center line of the drive shaft, and showing the parts in fully engaged relation.
Figure 6:
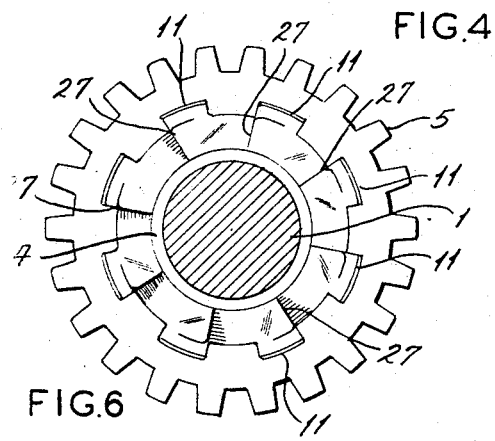
FIGS. 5 and 6 are transverse vertical sectional views along lines 5—5 and 6—6, respectively, of FIG. 2.
Figure 5:
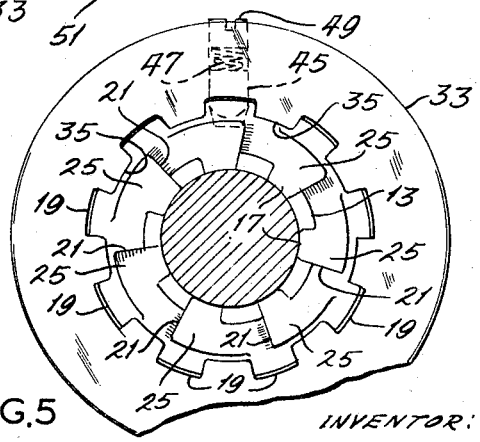

Operation of the device (as applied to an automobile) is as follows: For effecting a shift from driving gear 5 to 3, the operator opens valve 69 and evacuates cylinder 65. This could be done with the throttle (not shown) open. With the throttle open the torque load across the shift collar and driving gear 5 splines would be too high to permit the shift to be made, until the operator, by lifting his foot from the accelerator, permitted the throttle to close and thus break the flow of power through the splines of driving gear 5. Thereupon the torque load would reduce sufficiently so that the vacuum in cylinder 65 would cause movement of shift collar 33 to the right past the centered position shown in FIG. 2, but with the plunger 45 in the left hand notch 37 until sliding collar teeth 21 contacted teeth 27 on gear 3. Unless gear 3 was rotating faster than the input shaft (in which case the inclined surfaces of teeth 27 would engage sliding collar teeth 21 to push the sliding collar to the left and prevent engagement of teeth 21 and 27), the axial surfaces 23 of sliding collar teeth 21 would engage the corresponding surfaces 31 of teeth 27 on gear 3, aligning the sliding collar splines 19 with gear 3 splines 11 and permitting shift collar 33 to slide the full distance to the right to the position shown in FIG. 4, with plunger 45 in right hand notch 41 and shift collar inner splines 35 meshing with driving gear 5 splines 11, thus locking the input shaft to driving gear 5 and transmitting driving torque therebetween. If at the initiation of the shift just described the sliding collar 15 had not slid on its inner splines 17 on input shaft 1, as the shift collar moved to the right and its inner splines 35 became disengaged from splines 11 of gear 5, the inclined surfaces 27 of gear 5 teeth 21 would force sliding collar 15 to the right, and the shift would be completed as described above.

What is claimed is:

1. In a torque transmission device, an input shaft, a gear rotatably journaled on said shaft and having splines on its peripheral surface and its transverse face formed with radial teeth, a first collar nonrotatably and axially slidably mounted on said shaft in spaced relation with said gear and having outer splines, said first collar having radial teeth on its end facing said gear engageable with said radial teeth on said gear projections by axial movement of said first collar theretoward and arranged to drive said gear when engaged, said radial teeth being formed to transmit torque solely from said collar to said gear, a second collar mounted on said first collar and having inner splines in continuous engagement with said first collar outer splines and selectively engageable with the splines on said gear when said radial teeth are correspondingly engaged, yieldable means for transmitting axial movements of said second collar to said first collar and permitting further axial movement of said second collar into spline engagement with said gear after said first collar and gear radial teeth are engaged, and means for moving said second collar axially of said shaft into and out of engagement with said gear.

2. In a torque transmission device according to claim 1, said radial teeth on said gear and said first collar each having one surface inclined and another surface parallel to the axis of said shaft, said inclined surfaces all being inclined in the same direction with respect to the direction of rotation whereby to transmit torque solely from said collar to said gear.

3. In a torque transmission device according to claim 2, said radial teeth on said first collar having their forward surfaces parallel to the axis of said shaft and their rear surfaces inclined with respect to the axis of said shaft, said radial teeth on said gear having their rear surfaces parallel to the axis of said shaft and their forward surfaces inclined with respect to the axis of said shaft and parallel to the rear surfaces of said collar teeth.

4. In a torque transmission device according to claim 3, said shaft having splines and said first collar being inwardly splined to provide nonrotatable but slidable mounting on said shaft.

5. In a torque transmission device according to claim 1, a second gear rotatably journaled on said shaft in spaced relation with the opposite end of said first collar, said first collar and said second gear having similar radial teeth on their opposing transverse end surfaces, said second gear having splines on its peripheral surface selectively engageable with said second collar splines when said first collar and second gear radial teeth are engaged, said axial moving means also being arranged to move said second collar axially of said shaft into and out of engagement with said second gear.

6. In a torque transmission device according to claim 5, said radial teeth on said first collar having their forward surfaces parallel to the axis of said shaft and their rear surfaces inclined with respect to the axis of said shaft, said radial teeth on both said gears having their rear surfaces parallel to the axis of said shaft and their forward surfaces inclined with respect to the axis of said shaft and parallel to the rear surfaces of said collar teeth.

7. In a torque transmission device according to claim 5, said yieldable means comprising a radially movable plunger in said second collar, resilient means biasing said collar inwardly, and a plurality of notches in the peripheral surface of said first collar spaced apart lengthwise thereof and selectively registrable with said plunger whereby to transmit axial movement from said second collar to said first collar for moving said first collar into or out of engagement with said gear radial teeth and for permitting further movement of said second collar axially of said first collar into spline engagement with said gears.

8. In a torque transmission device according to claim 7, there being three of said notches spaced apart equidistantly, the end notches being engageable with said plunger when said second collar is in splined engagement with either of said gears whereby to hold said inner collar in engagement with said gear radial teeth and to transmit axial disengagement movement of said second collar to said first collar.

9. In a torque transmission device according to claim 5, spring means biasing said second collar into torque transmitting engagement with one of said gears, and selectively controlled power means opposing said spring means for moving said collars into torque transmitting engagement with said other gear.

10. In a torque transmission device according to claim 9, an annular groove in said second collar, an element slidably received in said groove and operatively connected to said spring means and power means for transmitting axial movements therefrom to said second collar.

References Cited

UNITED STATES PATENTS 2,349,491   5/1944   Dugas _____ 192—53.7
2,667,252   1/1954   Meyer _____ 192—53.2 XR
2,908,367  10/1959  Sinclair.

MARTIN P. SCHWADRON, Primary Examiner.

ALLAN D. HERMANN, Assistant Examiner.

U.S. Cl. X.R.

192—53, 67, 85, 87.14; 74—339